Figure 1:
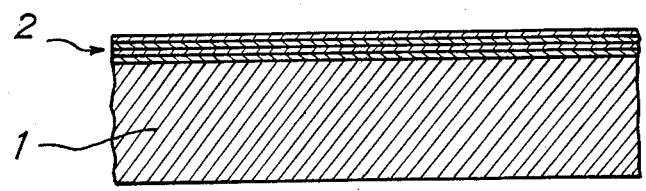

United States Patent [19]

Pelletier et al.

[11] 4,078,164

[45] Mar. 7, 1978

[54] PROCESS FOR THE ACCOMPLISHMENT OF DEEP MICROENGRAVING BY A LASER BEAM

[75] Inventors: Jacques Pelletier, Grenoble; François Rinchet, St. Martin d'Heres, both of France

[73] Assignee: Agence Nationale de Valorisation de la Recherche (ANVAR), Neuilly-sur-Seine, France

[21] Appl. No.: 647,764

[22] Filed: Jan. 9, 1976

[30] Foreign Application Priority Data

Jan. 9, 1975 France .............................. 75 00567

[51] Int. Cl.² ........................................... B23K 9/00
[52] U.S. Cl. ........................................... 219/121 LM
[58] Field of Search .................. 219/121 L, 121 LM; 346/76 L; 178/6.6 B, 6.6 TP; 350/290, 292, 298

[56] References Cited

U.S. PATENT DOCUMENTS

| | | | |
|---|---|---|---|
| 3,154,371 | 10/1964 | Johnson | 219/121 L X |
| 3,181,170 | 4/1965 | Akin | 346/76 L X |
| 3,410,979 | 11/1968 | Larsson | 219/121 LM X |
| 3,435,186 | 3/1969 | Roshon, Jr. et al. | 219/121 LM X |
| 3,553,421 | 1/1971 | Schawlow | 219/121 L |
| 3,560,291 | 2/1971 | Foglia et al. | 219/121 LM X |
| 3,665,483 | 5/1972 | Becker et al. | 346/76 L X |
| 3,790,744 | 2/1974 | Bowen | 219/121 LM |
| 3,832,948 | 9/1974 | Barker | 219/121 LM |

OTHER PUBLICATIONS

Summer Course in Modern Methods of Optical Design, (Notes on Multilayer Optical Filters), P. Baumeister, 1961.

*Primary Examiner*—J. V. Truhe
*Assistant Examiner*—Fred E. Bell
*Attorney, Agent, or Firm*—Haseltine, Lake & Waters

[57] ABSTRACT

A process for deep micro-engraving of a material includes the steps of superpositioning a plurality of elementary layers of respectively alternating indices on the material. Each of the layers is individually transparent to a predetermined wavelength in vacuum, and has an optical thickness equal to one quarter of the predetermined wavelength. The process further includes forming a plurality of openings in the elementary layers; the openings correspond to regions to be engraved on the material, and uncover selected portions of the material. The material is then illuminated by a laser beam of sufficient power to engrave, by sublimation, the uncovered material portions. The laser has the predetermined wavelength, and the plurality of layers form a mirror for the laser beam, which have a relatively high threshold of damage from the laser, and absorb substantially no power from the laser beam.

4 Claims, 3 Drawing Figures

U.S. Patent   March 7, 1978   4,078,164

PROCESS FOR THE ACCOMPLISHMENT OF DEEP MICROENGRAVING BY A LASER BEAM

This invention concerns a process for the accomplishment of micro-engraving by laser beam applicable to pieces of material of any kind whatever, such as metal, plastic, semiconductor, refractory, and the like.

Laser machining, characterized by the ability to melt or vaporize all materials, has been particularly developed in the course of recent years and one of its first applications was the piercing of diamond dies. However, although engraving on thin plates could be accomplished by filing techniques (x-y tables), the techniques of laser micromachining, while very valuable, could not be developed for three essential reasons, namely:

(a) unitary piercing was difficult for non-cylindrical geometries;

(b) machining was accomplished in a unitary manner (piercing, welding); and (c) machining at dimensions close to the wavelength of a laser beam was made impossible by reason of phenomena of diffraction.

To remedy these drawbacks, provision has been made to either interpose in the laser beam a mask which included, on one part of its surface, a metallic substance having a high power of reflection, and to leave parts of that surface transparent, or to incorporate this mask directly in the piece to be engraved, as described, for example, in French Pat. No. 2,073,180. The first option permits freedom from the constraints listed in paragraphs a, and b, above, while the second option makes it possible in addition to avoid the phenomenon of diffraction.

The drawbacks of the metallic reflecting layers, within the framework of the use described above, are numerous. The rates of reflection R of the metallic layers exceed or approach 99% only within the infrared region (for $CO_2$ lasers with $\lambda = 10.6$ microns: for aluminum the rate of reflection R is 98%, for silver 99.5% and for gold 99.4%). Further, in the case of the metal mirror, it may be considered that the unreflected energy is absorbed ($R+A=1$, where A is the coefficient of absorption), leading to very low thresholds of damage for such mirrors, in particular in case of use of pulsed power lasers. The field of application of metallic reflecting layers in the laser micromachining process is thus very restricted, i.e. it is usable within the infra-red spectrum, it can be used for relatively low power machining of materials having low evaporating points, such as plastics, engraving of designs exceeding one micron or more. The electromagnetic wave must be able to penetrate into the engraved geometry, and the size depends upon the shape of the design and upon the electromagnetic laser mode.

The object of the present invention is to provide a laser micromachining process permitting elimination of all previous difficulties and any appropriate selection, such as the nature of the objects to be engraved, the size of the design, the choice of the wavelength, and the like. To this end, the process for deep micro-engraving by laser beam in materials of any kind whatever, where there is first deposited, on the piece to be engraved, a surface layer designed to reflect a laser beam of wavelength $\lambda$, there are formed openings in the surface layer openings corresponding to the zones to be engraved, and the selected material is then illuminated by a laser beam having a wavelength $\lambda$, and being sufficiently powerful to engrave, by sublimation, the uncovered parts appearing in the openings made in the surface layer. In that process there is used, as a surface layer, a superposition of $n$ ($n > 1$) elementary layers of different indices, individually transparent for the wavelength $\lambda$ in vacuum and having an optical thickness of $\lambda/4$, so that the layers form a laser mirror having a high threshold of damage due to almost zero absorption of light in the layers.

The process, according to the invention permits combining the advantages of the techniques of conventional engraving on thin layers with those of laser machining, including, on one hand, the depth of engraving and, on the other, application to all materials such as metal semi-conductors, insulators, plastics, and the like. The conventional engraving processes on thin plates, by chemical attack, ion erosion, and the like do not make it possible to obtain engraving thicknesses exceeding one micron. Moreover, the techniques of laser fashioning or machining have permitted the fashioning of diamond dies having a diameter of fifty microns with a depth of the order of a millimeter.

On the other hand, the process according to the present invention, which combines the techniques of masking and of laser machining, is limited only, on one hand, by the resolution obtained by conventional masking techniques which are typically one micron, and, on the other hand, by the wavelength of the machining laser, typically 1.06 micron for the YAG laser. However, these limits will most certainly be exceeded as a result of evolution of the technique.

The process according to the invention, may be applied in numerous fields, specifically for the accomplishment of deep micro-engraving, for example, making micro-molds, or the piercing of thick plates. In the latter case there may be obtained, by putting into operation the process according to the invention, the manufacture of filters, screens for determining dust particle size, multiwire wire dies, thick masks, porous ionizers for sources of positive or negative ions with surface ionization, e.g. application to ion propulsion, source of ions for ionic implantation, and the like, multicontacts, lattices, grids, microparts by cutting, and the like.

According to a particular application of the process to piercing, it has been possible to obtain a lattice of round holes 5 microns in diameter, spaced at a pitch of 10 microns apart, in a stainless steel disc 50 microns thick and 1 cm in diameter. Because of this, there is obtained a density of $10^6$ holes/cm$^2$, and a porosity close to 20%.

The use of a laser mirror in the micro-engraving process according to the invention offers several advantages. First of all, by increasing the elementary layers of the laser mirror, there may be obtained a coefficient of reflection practically equal to unity. On the other hand, metal mirrors attain a coefficient of reflection of 0.98 only for long wavelengths. Moreover, the laser mirror transmits through itself all the energy that it does no reflect, while a metal mirror absorbs the energy that is not reflected.

These two particular characteristics of the laser mirror cause the threshold of damage of the mirror commonly to exceed 10 GW/cm$^2$. The use of only one such laser mirror permits machining and, specifically, engraving refractory materials by means of a laser beam, which is a principal object of the invention. In effect, by using a known process such as the one described in French Pat. No. 2,073,180, it is impossible to engrave refractory materials, because the energy absorbed in the uncovered zones of this refractory mirror by the different parts of the mirror, is not sufficient to bring the temperature to a level such that it produces sublimation of the refractory material.

On the other hand, the process according to the invention permits the machining of refractory materials, such as tungsten, whose boiling or evaporating point to atmospheric pressure is above 5,600° C.

Another advantage of the use of the laser mirror is that the wavelength of the laser beam may be selected at will, as a function of the material to be engraved or as a function of the laser mirror itself. In effect, the thickness of the laser mirror increases with the wavelength. On the other hand, the use of a metal mirror requires the exclusive utilization of a long wavelength (10.6 microns for example) to obtain a sufficient coefficient of reflection. Otherwise, vaporization and degradation of the metal mirror cannot be avoided.

A further advantage of the process, according to the invention, is that it permits complete freedom from diffraction: in effect, since the machining of designs having a size near the wavelength $\lambda$ of the laser is normally impossible by reason of the phenomenon of diffraction, it permits avoidance of this drawback because a different wavelength may then be selected, due to the fact that the wavelength may vary within a rather broad range.

Finally, the process according to the invention, which calls for a laser wavelength that may vary very broadly, may be used for piercing and other machining of very small, sizes below a micron, since the electromagnetic wave must be able to penetrate into the engraved geometry, the dimensions depending upon the shape of the design and the electromagnetic mode employed.

Figure 2:
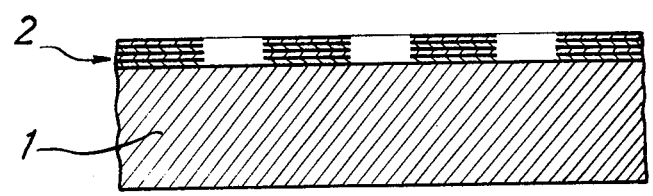
Figure 3:
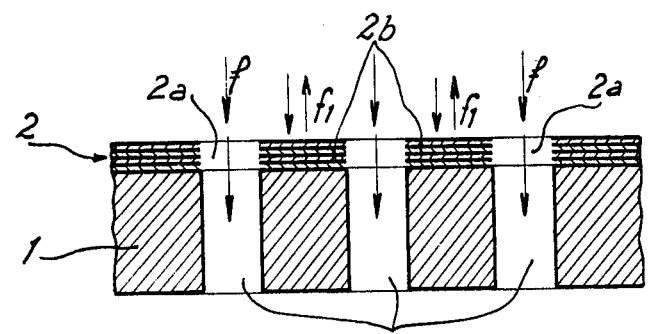

Below there will be described, by way of a non-limiting example, one form of embodiment of the present invention, with reference to the accompanying drawing in which:

FIGS. 1, 2 and 3 are schematic sectional views illustrating, respectively, the three principal phases of the process.

The first phase of the process, which is illustrated by FIG. 1, consists in deposition, on the surface of a substrate 1 to be engraved, of a laser mirror 2. The laser mirror includes a superposition of n elementary layers ($n$ being greater than 1 and generally not exceeding 21), the elementary layers being transparent for the wavelength $\lambda$ in vacuum of the laser beam, and being used consecutively, each layer having an optical thickness equal to $\lambda/4$ and having different indices. By way of example, a laser mirror including superposition of 21 quarter wave ($\lambda/4$) dielectric layers alternately having indices $n_1 = 1.35$ and $n_2 = 2.35$ on a substrate having an index of 1.52 provides a reflecting power, for the wavelength $\lambda$ $R = 00.998\%$ or $A = 2/100,000$, A being the rate of absorption. If the laser mirror has only 12 layers, the rate of reflection R falls to 99.66%. The threshold of damage of such mirrors is commonly over 10 GW/cm².

The total thickness of such mirrors is generally from 1 to several microns, according to the wavelength used, and the number of layers.

Deposition of the laser mirror may be accomplished industrially under vacuum on any substrate whatsoever, by different conventional techniques.

The second phase of the process, according to the invention includes the engraving of the mirror to obtain the mask used in the third phase of laser machining (FIG. 2).

Engraving of the mirror, i.e. shallow cutting, may be done by conventional techniques. These include two stages, namely, (1) fabrication of a photomask; on this mask there is outlined the micro-engraving configuration, which may be a single or a repetetive design. Only one mask is necessary for each engraving configuration and it may be used many times over.

(2) engraving of the mirror from the photomask; the conventional technique consists in deposition of a photoresin on the mirror which is then exposed to ultra-violet light through the photomask accomplished in step 1. The parts of the layer of photoresin which are illuminated through the photomask, polymerize and so resist a subsequent chemical attack which permits engraving the mirror.

For engraving of the mirror any other conventional technique, such as physical engraving (ion erosion) or mixed engraving (plasma, or electronic engraving and the like may be used.

The third phase of the process, according to the invention (FIG. 3), consists in laser machining of the piece to be engraved through the openings previously arranged in the engraved mirror only zones of the substrate 1 being exposed to laser radiation. To this end, the whole of the surface 2, previously engraved by a laser beam $f$ of sufficient power to obtain the sublimation of the parts 1a of the substrate 1 appearing through the openings 2a of the mirror, is illuminated, without the laser beam reaching threshold at which damage may be caused to the mirror. This beam ($f_1$) is reflected by the non-engraved parts 2b of the mirror 2. The engraving proper of the piece may be accomplished in one single or a plurality of illuminations according to the depth to be pierced. This depth will be homogeneous only if the energy density of the beam is the same over the entire section of the piece or material to be engraved.

If the surface is too large to be engraved at one time, an x-y table may be used to file the surface. In the event that the piece to be engraved is of a material susceptible to oxidation, it is advisable to undertake engraving by laser beam under a flux of rare gas (argon, helium, etc.) or under vacuum.

There will be considered by way of example the case of a plane piece of metal, having a typical metallic reflection coefficient $R_m$ of 60% before melting and vaporization, covered by a dielectric laser mirror having a coefficient of relfection R greater than 99.99%. The energies absorbed by the parts uncovered and not uncovered, respectively, of the piece are proportional to 1-$R_m$ and (1-R) (1-$R_m$). In the uncovered parts through the openings of the mirror, the energy absorbed is equal to 40% of the incident energy before sublimation, and then close to 100%. Elsewhere, i.e., in zones of parts not uncovered, or hidden by the layer of dielectric mirror, the energy absorbed is $10^4$ times less. Such a ratio is essential for refractories.

The laser beam f is applied perpendicular to the surface of the mirror 2, or at any other desired angle of incidence, the optical thickness of the layers of the mirror then having to be adjusted to that incidence.

Although the process has been described in one application to the engraving of a plane surface, it is clear that it may likewise be used to engrave surfaces having any shape whatever.

We claim:

1. A process for deep micro-engraving of a material comprising the steps of:
    superpositioning a plurality of elementary layers of respectively alternating indices of refraction on the material, each of the layers being individually transparent to a predetermined wavelength in vacuum, and having an optical thickness equal to one quarter of the predetermined wavelength;
    forming a plurality of openings in the elementary layers, the openings corresponding to regions to be engraved on the material, the openings uncovering selected portions of the material; and
    illuminating the material by a laser beam of sufficient power to engrave, by sublimation, the uncovered material portions, the plurality of dielectric of alternating indices forming a mirror for the laser beam, having a relatively high threshold of damage from the laser, and absorbing substantially no power from the laser beam.

2. A process according to claim 1, further including the step of illuminating the material by a laser beam having an incident energy of 10 G W/cm$^2$, the laser mirror having a threshold damage at least equal to said incident energy.

3. A process according to claim 1, wherein the material is a refractory material.

4. A process according to claim 1, wherein one of said indices is 1.35 and the other of said indices is 2.35, and wherein the material is a substrate having an index of 1.52.

* * * * *